United States Patent [19]
Ito et al.

[11] Patent Number: 5,202,873
[45] Date of Patent: Apr. 13, 1993

[54] AGC CIRCUIT FOR OPTICAL DISK DATA REPRODUCING APPARATUS USING ALPC PERIOD DETECTOR

[75] Inventors: Motoshi Ito, Toyonaka; Kenzo Ishibashi, Moriguchi; Takashi Inoue, Osaka; Shunji O'Hara, Higashiosaka, all of Japan

[73] Assignee: Matsushita Electric Industrial Co., Ltd., Osaka, Japan

[21] Appl. No.: 634,553

[22] Filed: Dec. 27, 1990

[30] Foreign Application Priority Data
Jan. 12, 1990 [JP] Japan ............................... 2-5888

[51] Int. Cl.$^5$ ............................... G11B 7/125
[52] U.S. Cl. ................... 369/48; 369/44.35; 369/116
[58] Field of Search ............... 369/44.25, 48, 47, 54, 369/58, 116, 112, 32, 44.35, 44.27

[56] References Cited
U.S. PATENT DOCUMENTS
4,831,626 5/1989 Watanabe et al.
4,855,988 8/1989 Shinbayashi et al. ............... 369/116

OTHER PUBLICATIONS
"Interim Version of DIS 10089", ISO/IEC JTCI Information Technology, Jul. 1990.

Primary Examiner—Andrew L. Sniezek
Assistant Examiner—Muhammad Edun
Attorney, Agent, or Firm—Wenderoth, Lind & Ponack

[57] ABSTRACT

Data read from an optical disk includes an address period, an ALPC period and a data period, in which the ALPC period contains a no-signal state at opposite ends of a laser output signal. An ALPC period detector is provided for detecting the ALPC period. During the ALPC period, an automatic gain control circuit is suspended to hold the gain to the predetermined value. Alternatively, during the ALPC period, the signal applied to the automatic gain control circuit is reduced to ground level or is attenuated. Thus, since the automatic gain control circuit will not be adversely affected by the laser output signal and no-signal state in the ALPC period, the automatic gain control circuit will amplify the signal in the data period with an appropriate gain.

5 Claims, 8 Drawing Sheets

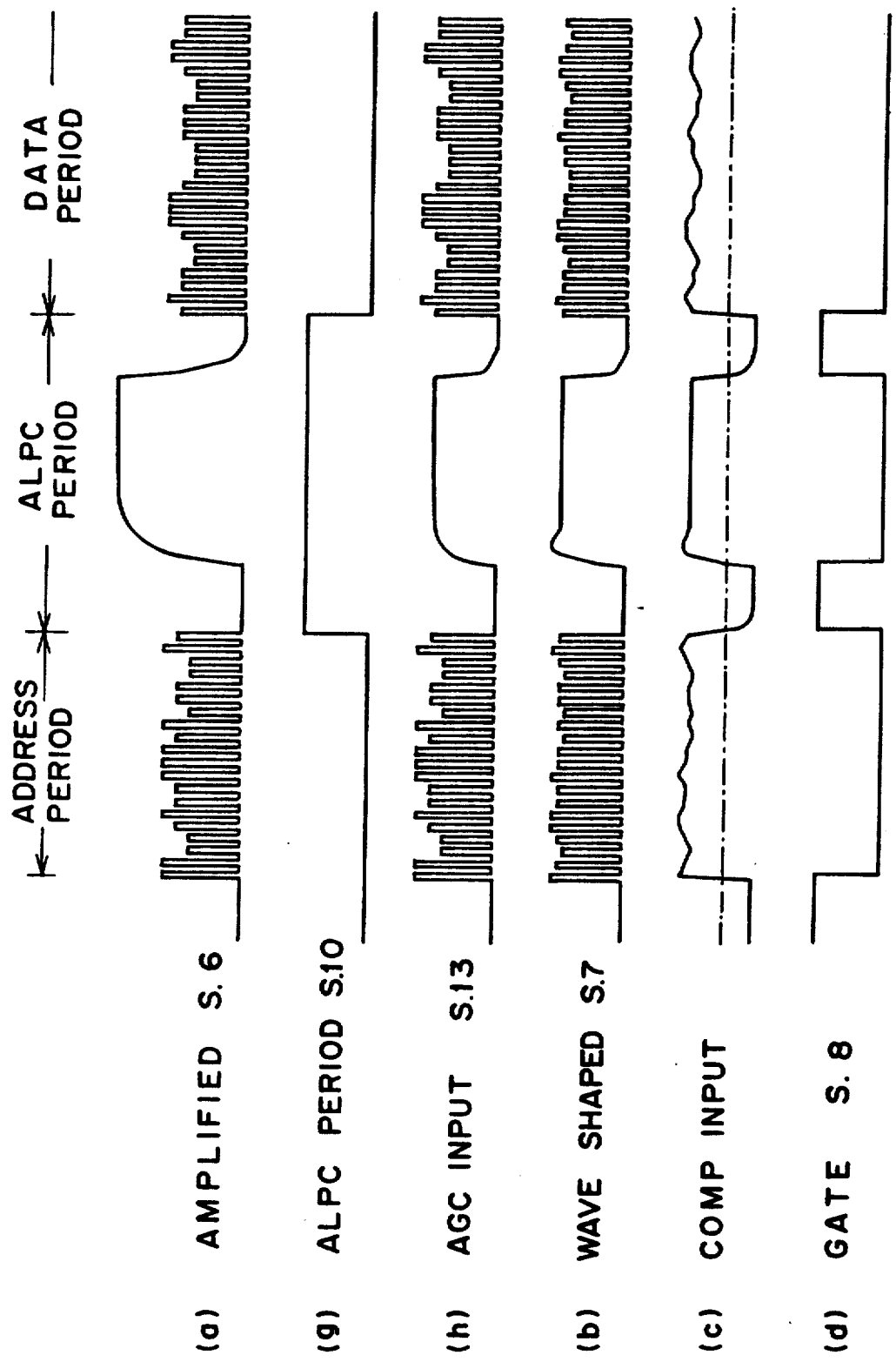

AGC CIRCUIT FOR OPTICAL DISK DATA REPRODUCING APPARATUS USING ALPC PERIOD DETECTOR

BACKGROUND OF THE INVENTION

1. Field of the Invention

The present invention relates to a writable or rewritable optical disc device, and more particularly, to an optical disk data reproducing apparatus which controls either directly or indirectly an automatic gain control circuit which unifies variations in signal amplitude, using an automatic laser power control (ALPC) period signal indicating that the laser power is being automatically adjusted.

2. Description of the Prior Art

The read signal from an optical disk is an intermittent signal containing no-signal periods, and the amplitude of the read signal may be changed by the frequency of the read signal or by the disc media itself. A conventional optical disk data reproducing apparatus typically has an automatic gain control circuit comprising an automatic gain adjustment function to smooth such amplitude changes in the read signal, and a gain hold function to hold the gain level constant during the no-signal period.

A conventional optical disk data reproducing apparatus is shown in FIG. 1. In FIG. 1, element 1 is an optoelectric conversion circuit; element 2 is an RF amplifier; element 3 is an automatic gain control circuit; element 4 is a signal presence detector; element 5 is a weak voltage signal; element 6 is an amplified signal; element 7 is a wave shaped signal; element 8 is a no-signal state gate signal; element 101 is a PIN diode; element 102, 103, 201; element 202 and 203 are resistors; element 204 is an operational amplifier, 301 is an automatic gain controller, 401 is a diode; element 403 is a capacitor, and element 404 is a comparator.

The optoelectric conversion circuit 1 receives a read light at the PIN diode 101 and converts the light to a weak current, which is converted to a weak voltage signal 5 by a current-voltage convertor circuit comprising resistors 102 and 103 and an operational amplifier 104. The weak voltage signal 5 is amplified by an RF amplifier 2, comprising resistors 201, 202 and 203 and operational amplifier 204. RF amplifier 2 produces an amplified signal 6. The amplified signal 6 is shaped by the automatic gain control circuit 3 comprising an automatic gain controller 301. The wave shaped signal 7 as produced from the automatic gain control circuit 3 is applied to a signal presence detector 4. The signal presence detector 4 includes an envelope detector comprising the diode 401, resistor 402, and capacitor 403, which produces an envelope detected signal indicating the change in amplitude of the wave shaped signal 7. The envelope detected signal and a threshold value are compared by the comparator 404, and when the envelope detected signal is less than the threshold value, a no-signal state gate signal 8 is set TRUE, indicating that the wave shaped signal is now in a no-signal state. The no-signal state gate signal 8 is input as the gain hold control signal of the automatic gain control circuit 3. Thus, when the no-signal state gate signal 8 is TRUE, the automatic gain control circuit 3 holds the gain to a predetermined constant value. This is to prohibit unnecessary signal amplification or attenuation to shape the amplitude of the wave shaped signal 7 regardless of whether the automatic gain control circuit 3 is in a no-signal state.

In general, the optical disc media contains both an address period to which is written position information identifying the location of data on the media, and the actual data storage period to which the actual data is written. In addition, there is an ALPC period provided in a writable optical disc media for adjustment of the laser power required for data writing. This ALPC period is generally provided between the address period and the data period. During the ALPC period, the laser power is kept witting power longer than the pulse length in the data period. As a result, heat builds up easily in the ALPC period, causing the crystal structure to change and deteriorate and media deformation to progress more rapidly, resulting in a higher and abnormal read signal amplitude.

However, because the signal amplitude in the ALPC period is not considered in a conventional device as described above, the problem exists that an inappropriate gain level is set for the read signal in the data period adjacent to the automatic laser power control because the automatic gain controller adjusts the gain based on the signal amplitude in the ALPC period.

Problems confronted with the prior art are described below with reference to the accompanying figures. In FIG. 2 is shown a graph of the read signal from the address period through the ALPC period and to the data period. In FIG. 2, waveform (a) is the amplified signal 6, which is the output signal of the RF amplifier 2; waveform (b) is the wave shaped signal 7, which is the output signal of the automatic gain control circuit 3; waveform (c) is the input signal to the comparator 404 in the signal presence detector 4; waveform (d) is the no-signal state gate signal 8, which is the output signal of the signal presence detector 4 and in the prior art is the gain hold signal which controls the automatic gain control circuit 3; and waveform (e) represents the gain of the automatic gain control circuit 3. Because the laser is output continuously with a high output level in the ALPC period, the waveform (a) of the amplified signal 6 obtains an extremely high read signal compared with that of the address period and data period, resulting in deterioration of the media and the frequency characteristics of the read system.

The operation in the no-signal period at the beginning of the ALPC period adjacent to the address period, and the operation in the no-signal period at the end of the ALPC period adjacent to the data period are described first.

The automatic gain control circuit 3 attempts to reduce the signal amplitude change of the amplified signal 6, but the response rate of the automatic gain control circuit 3 is unable to follow the rapid change of the no-signal period. Therefore, the wave shaped signal 7 output from the automatic gain control circuit 3 becomes a zero amplitude signal at the beginning of the no-signal period adjacent the data period. The signal presence detector 4 generates an envelope detected signal of the wave shaped signal 7. The envelope detected signal (solid line in (c)) is compared in comparator 404 with the threshold value (dot-dash line in (c)), and the no-signal state gate signal 8 (d) is set to TRUE when envelope detected signal becomes below the threshold value. During the TRUE period, the gain of automatic gain control circuit 3 is held to the predetermined value. Thus, during the no-signal periods at the beginning and ending of the ALPC period, the change of the gain level is suspended.

Operation with a signal in the period to which the laser is emitted continuously to control the laser power in the ALPC period is described next. As described above, the amplitude of the waveform (a) of the amplified signal 6 in the ALPC period is greater than that in the address period and the data period for the reasons described above. The automatic gain control circuit 3 therefore adjusts the gain level to a relatively constant level, as show by the wave shaped signal 7.

Finally, operation with a signal at the beginning of the data period is described. In the no-signal period at the end of the ALPC period adjacent to the data period, the automatic gain control circuit 3 remains set with a low gain level to hold the gain level constant by the operation described above. Therefore, at the beginning of the data period, the waveform (b) of wave shaped signal 7, which is the output of the automatic gain control circuit 3, becomes smaller. The envelope detected signal of the wave shaped signal 7 and a threshold value are compared by the comparator 404 in the signal presence detector 4, and when the input signal (solid line in (c)) of the comparator 404 is greater than the threshold value (dot-dash line in (c)), the signal presence detector 4 sets to FALSE and outputs the no-signal state gate signal 8 (d). Because the no-signal state gate signal 8, which is the gain hold control signal, is FALSE, the automatic gain control circuit 3 gradually increases the gain level to amplify the waveform (b) of the amplified signal 6 a constant amount. Conversely, when the input signal (solid line in (c)) is lower than the threshold value, the no-signal state gate signal 8 (d) remains TRUE, and the automatic gain control circuit 3 continues to hold a constant gain level. As a result, the amplitude of the amplified signal 6 waveform (b) remains low, and a stable read signal cannot, therefore, be obtained.

SUMMARY OF THE INVENTION

The object of the present invention is therefore to provide an optical disk data reproducing apparatus which obtains a stable read signal without the automatic gain control circuit setting an unsuitable gain level due to the read signal in the ALPC period.

An optical disk data reproducing apparatus according to a first embodiment of the present invention comprises: an optoelectric conversion means for optically reading data on said optical disk and for converting the read data to an electrical signal; an automatic gain control means for receiving and changing the amplitude of said electrical signal, said automatic gain control means having an active state and suspended state such that during the active state the gain is automatically controlled relatively to the electrical signal applied thereto, and during the suspended state the gain is held to the predetermined value; and an ALPC period detecting means for detecting said ALPC period in said data and for producing an ALPC period signal indicative of the ALPC period, said automatic gain control means being set to said suspended state when said ALPC period signal is present and to said active state when said ALPC period signal is not present.

According to the first embodiment, the apparatus further comprises: a signal presence detect means for detecting no-signal state in said electrical signal and thereupon producing a no-signal state signal; and OR gate means for logically ORing said no-signal state signal and said ALPC period signal, and for providing OR-ed signal to said automatic gain control means, whereby said automatic gain control means being set to said suspended state when either one of said ALPC period signal and said no-signal state signal is present and to said active state when neither of said ALPC period signal and no-signal state signal is present.

An optical disk data reproducing apparatus according to another embodiment of the present invention comprises: an optoelectric conversion means for optically reading data on said optical disk and for converting the read data to an electrical signal; a switch means having an output which is switched between a first line carrying said electrical signal and a second line carrying a reduced level signal; an ALPC period detecting means for detecting said ALPC period in said data and for producing an ALPC period signal indicative of the ALPC period, said switching means being switched to connect said first line to said output when said ALPC period signal is not present and to connect said second line to said output when said ALPC period signal is present; an automatic gain control means connected to said output for receiving and changing the amplitude of the signal from said switch means, said automatic gain control means having an active state and suspended state such that during the active state the gain is automatically controlled relatively to the electrical signal applied thereto, and during the suspended state the gain is held to a gain as set immediately before the suspended state; and a signal presence detect means connected to said automatic gain control means for detecting no-signal state in said signal produced from automatic gain control means and thereupon producing a no-signal state signal, said automatic gain control means being held in said suspended state when said no-signal state signal is present.

According to the second embodiment, said reduced level is a ground level, whereby said signal presence detecting means detects the no-signal state during the ALPC period entirely to prevent said automatic gain control means from greatly amplifying signals during said ALPC period.

According to the third embodiment, said reduced level is an attenuated level, thereby preventing said automatic gain control means from greatly amplifying signals during said ALPC period.

By the above described present invention, according to the first embodiment, the automatic gain control circuit is held in the suspended state during the ALPC period. According to the second embodiment, only the ground level signal is transmitted through the automatic gain control circuit during the ALPC period. According to the third embodiment, an attenuated signal is transmitted through the automatic gain control circuit during the ALPC period.

Thus it is possible to obtain a stable read signal in the data period, and thus preventing the automatic gain control circuit from setting an inappropriate gain level due to the read signal in the ALPC period. The effect of obtaining a stable signal in the data period is outstanding, particularly when an abnormal read signal is generated due to media deterioration in the ALPC period where media deterioration advances most easily.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 8(a-e) are diagrams of the signal waveform before and after the ALPC period in the third embodiment of the present invention.

DETAILED DESCRIPTION OF THE PREFERRED EMBODIMENTS

A first embodiment of an optical disk data reproducing apparatus according to the present invention is described with reference to the accompanying figures.

Figure 1:
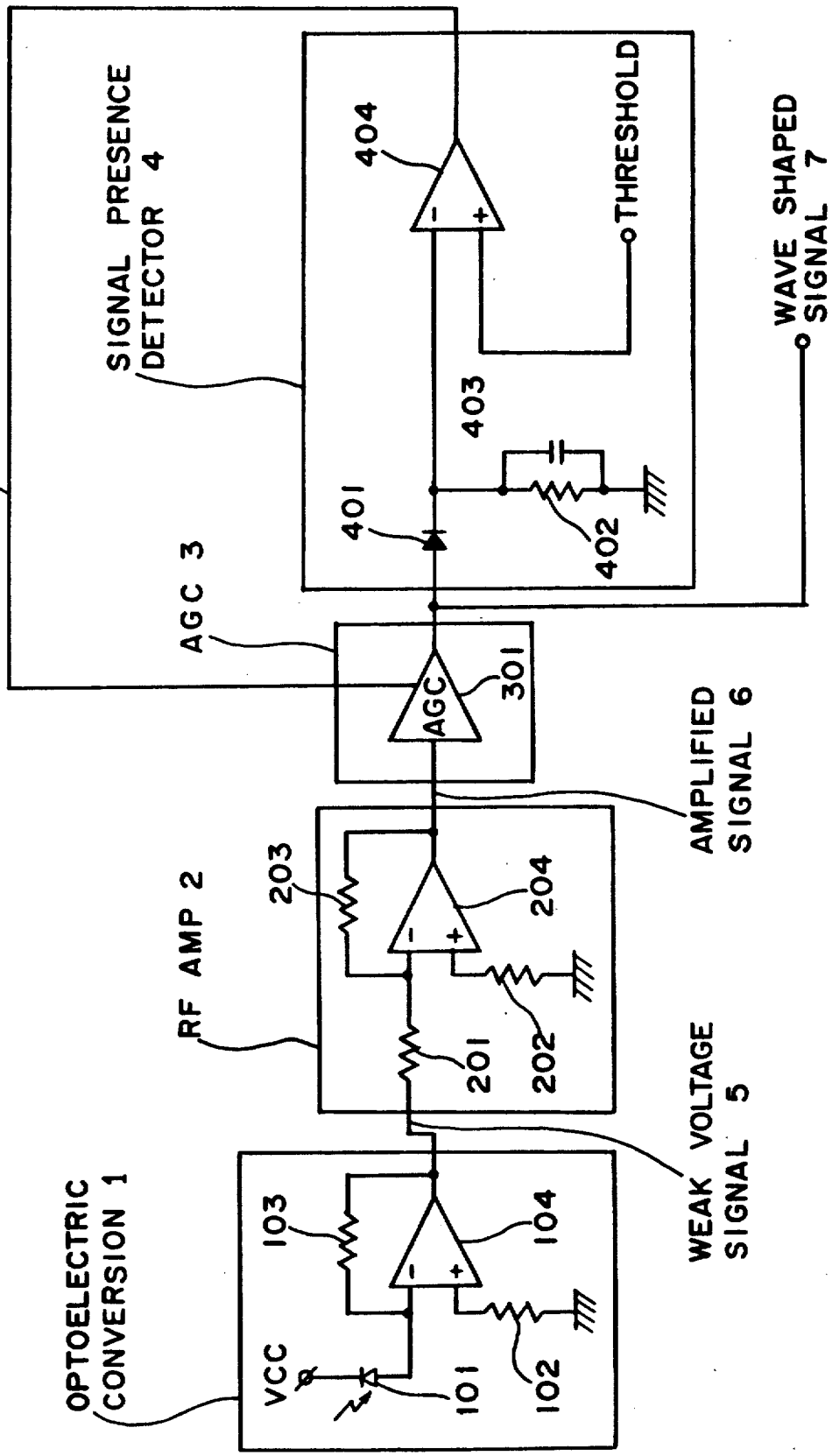
FIG. 1 is a block diagram of a prior art optical disk data reproducing apparatus.
Figure 3:
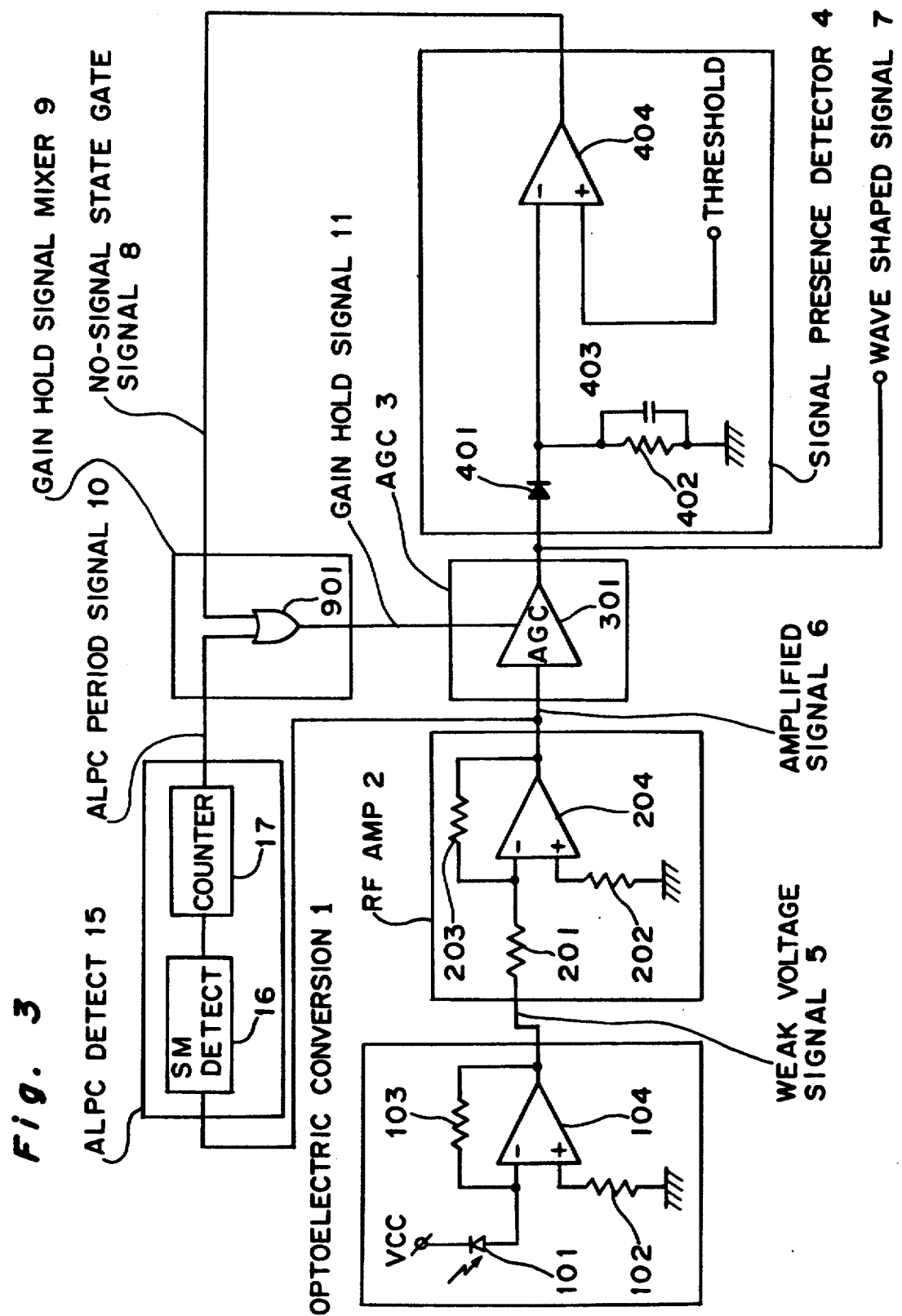
FIG. 3 is a block diagram of a first embodiment of an optical disk data reproducing apparatus of the present invention.

Referring to FIG. 3, a block diagram of an optical disk data reproducing apparatus according to a preferred embodiment of the present invention is shown. Like parts in FIG. 3 and the prior art disk data reproducing apparatus in FIG. 1 are identified with like element. In FIG. 3, reference number 1 is an optoelectric conversion circuit; element 2 is an RF amplifier; element 3 is an AGC (automatic gain control) circuit; element 4 is a signal presence detector; element 5 is a weak voltage signal; element 6 is an amplified signal; element 7 is a wave shaped signal; element 8 is a no-signal state gate signal; element 9 is a gain hold signal mixer; element 10 is an ALPC period signal; element 11 is a gain hold signal; element 15 is an ALPC detector; element 16 is a sector mark detector; element 17 is a counter; element 101 is a PIN diode; element 102 is a resistor; element 103 is a resistor; element 201 is a resistor; element 202 is a resistor; element 203 is a resistor; element 204 is an operational amplifier; element 301 is an automatic gain controller; element 401 is a diode; element 402 is a resistor; element 403 is a capacitor; element 404 is a comparator element and element 901 is an OR gate.

The optoelectric conversion circuit 1 receives a read light at the PIN diode 101 and converts the light to a weak current, which is converted to a weak voltage signal 5 by circuit of a current-voltage convertor comprising resistors 102 and 103 and an operational amplifier 104. The weak voltage signal 5 is amplified by an RF amplifier 2 comprising resistors 201, 202, and 203 and operational amplifier 204, and output as amplified signal 6. The amplitude of the amplified signal 6 is shaped by the automatic gain control circuit 3 comprising an automatic gain controller 301, and output as a wave shaped signal 7. This wave shaped signal 7 is input to a signal presence detector 4.

The signal presence detector 4 has an envelope detector, which comprises a diode 401, resistor 402, and capacitor 403, and which generates an envelope detected signal indicating the change in amplitude of the wave shaped signal 7. The envelope detected signal and a threshold value are compared by the comparator 404, and if the envelope detected signal is less than the threshold value, a no-signal state gate signal 8 indicating that the envelope detected signal is a no-signal state is set TRUE. The gain hold signal mixer 9 comprising an OR gate 901 outputs a gain hold signal 11 which is the logical OR of the no-signal state gate signal 8 and the ALPC period signal identifying the ALPC period.

The ALPC period signal is produced by ALPC detector 15 including the sector mark detector 16 and the counter 17. The sector mark detector 16 receives the optical digital data from RF amplifier 2 and detects a sector mark which is inserted at the beginning of each sector. The ALPC period is, for example, two bytes long and is located 59 bytes spaced from the sector mark. Thus, upon detection of the sector mark, the counter 17 starts counting the number of bytes and produces TRUE when 59 bytes are counted, and returns to FALSE when 61 bytes are counted. The number of bytes counted by counter 17 to produce TRUE and FALSE may be varied according to the format being used. Also, instead of RF amplifier 2, the optical digital data may be obtained from the output of optoelectric conversion 1 or AGC 3.

The gain hold signal 11 is input as the gain hold control signal of the automatic gain control circuit 3, and when the gain hold signal 11 is TRUE, the automatic gain control circuit 3 is set to a suspended state in which the gain is held to the predetermined value.

Figure 2:
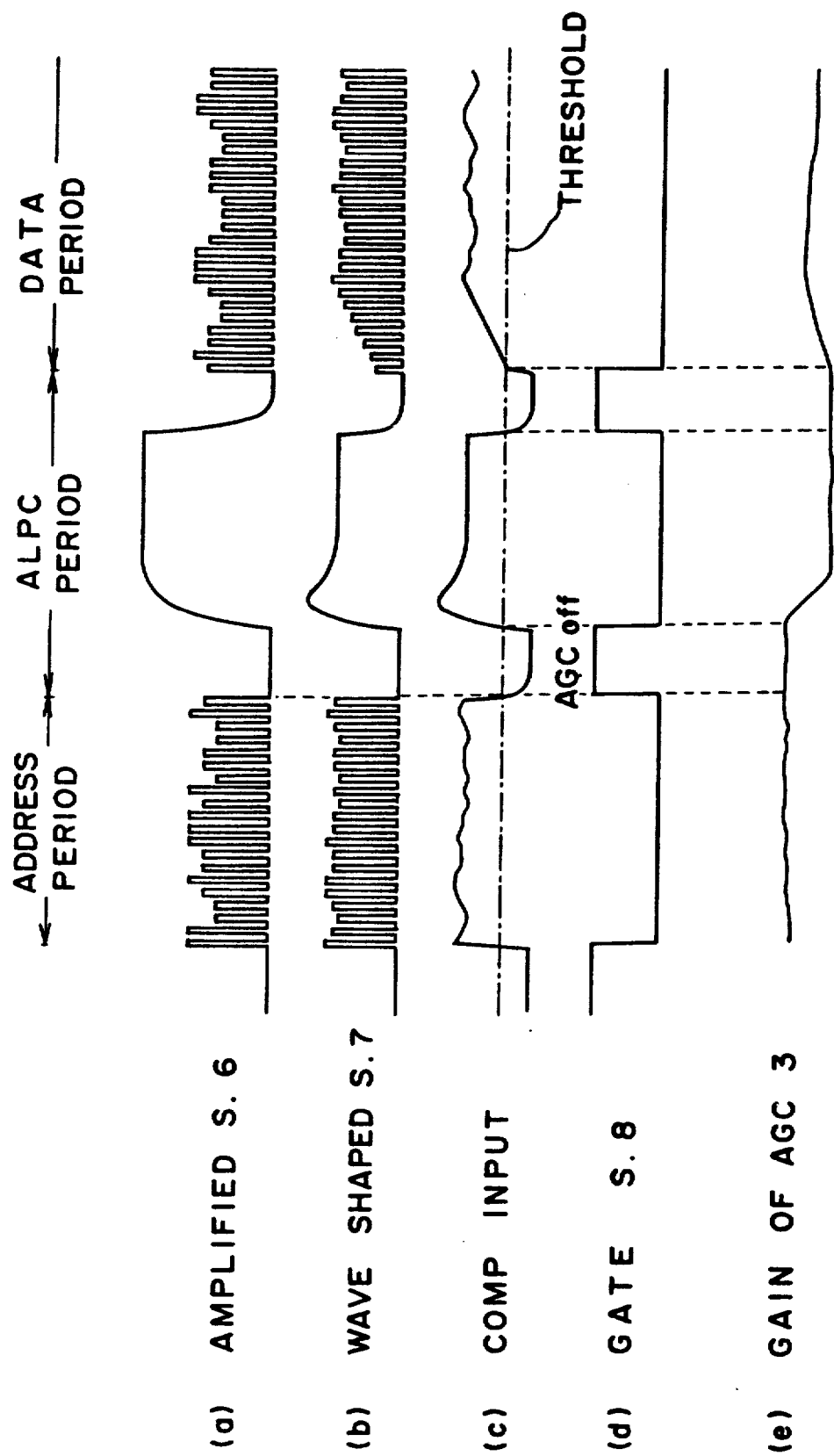
FIGS. 2(a-e) are diagrams of the signal waveform before and after the ALPC period for the purpose of describing the problem of the prior art.
Figure 4:
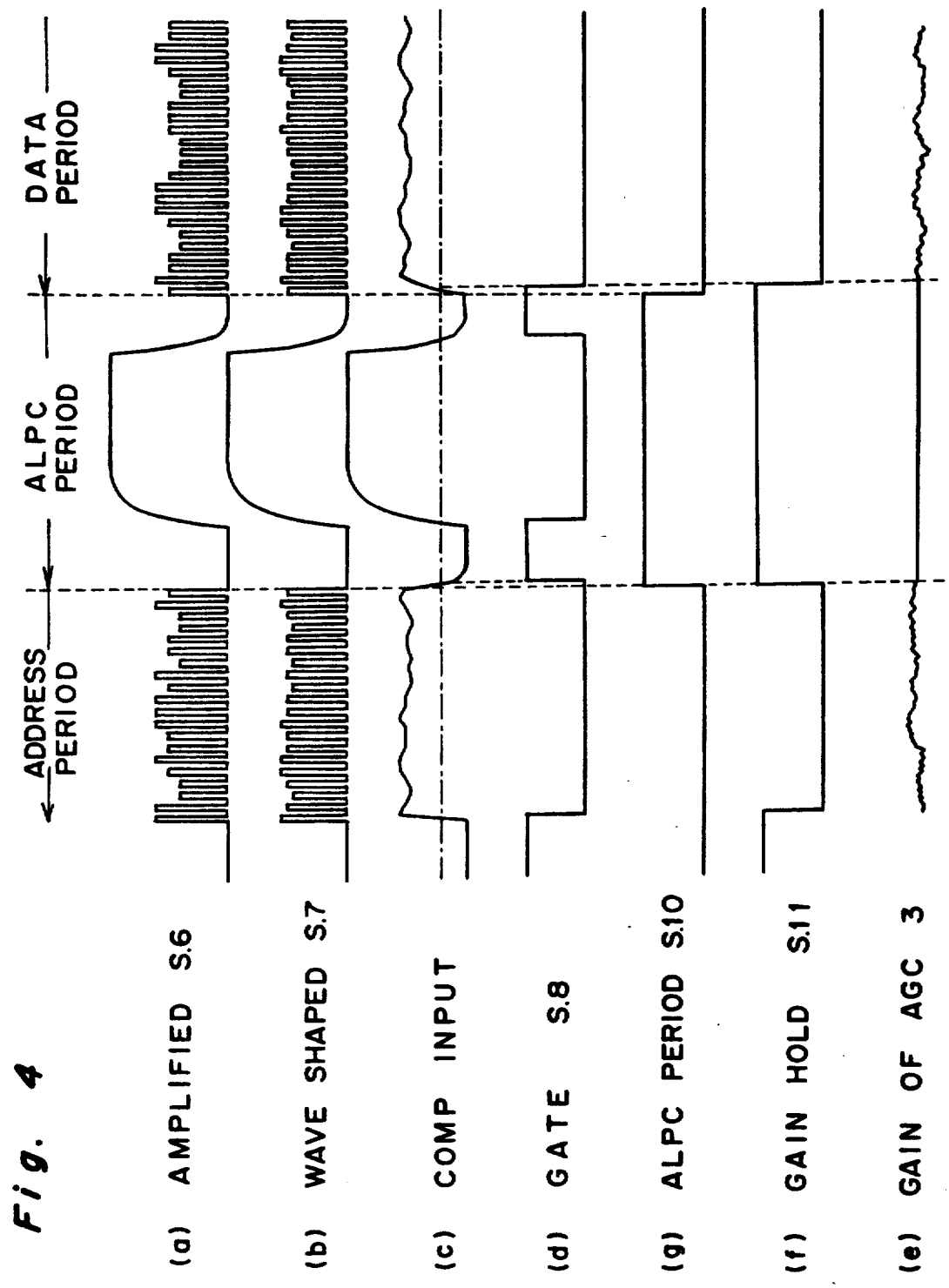
FIGS. 4(a-e) are diagrams of the signal waveform before and after the ALPC period in the first embodiment of the present invention.

FIG. 4 shows the signal waveforms before and after the ALPC period. In FIG. 4, like signals are identified with like reference letters used in FIG. 2. In FIG. 4, (a) is the waveform of the amplified signal 6 output from the RF amplifier 2; (b) is the waveform of the wave shaped signal 7 output from the automatic gain control circuit 3; (c) is the waveform of the input signal to the comparator 404 in the signal presence detector 4; (d) is the waveform of the no-signal state gate signal 8 output from the signal presence detector 4; (e) is the waveform indicating the gain of the AGC 3; (f) is the waveform of the gain hold signal 11 output from the gain hold signal mixer 9 for controlling the automatic gain control circuit 3; and (f) is the waveform of the ALPC period signal 10 identifying the ALPC period.

The waveform (a) of the amplified signal 6 has a signal amplitude significantly greater in the ALPC period than in the address period and the data period.

The operation in the ALPC period is described first. In the ALPC period, the ALPC period signal (f) identifying the ALPC period becomes TRUE. As a result, the gain hold signal (e), which is the logical OR of the ALPC period signal (f) and the no-signal state gate signal (d), also becomes TRUE. Therefore, the shape of the wave shaped signal 7 (b) and the amplified signal (a) are the same, because the automatic gain control circuit 3 holds a constant gain level.

The operation in the data period after the ALPC period is described next.

In the data period, the gain hold signal (e) becomes FALSE because both the ALPC period signal (f) identifying the ALPC period and the no-signal state gate signal (d) identifying a no-signal state are FALSE. Therefore, the automatic gain control circuit 3 controls the gain level to hold the amplitude of the wave shaped signal (b) constant. At the beginning of the data period, the gain level matches the gain level at the end of the address period because the automatic gain control circuit 3 holds the gain level in the ALPC period. Therefore, if there is not a great difference in the amplitude of the amplified signal (a) between the address period and the data period, the signal can be stably reproduced in the data period because the difference in the held gain level and the gain level used by the automatic gain control circuit 3 to maintain the target amplitude in the wave shaped signal (b) is small.

Thus, a stable read signal can be obtained by the preferred embodiment of the present invention even when an abnormal read signal is generated in the ALPC period.

Figure 5:
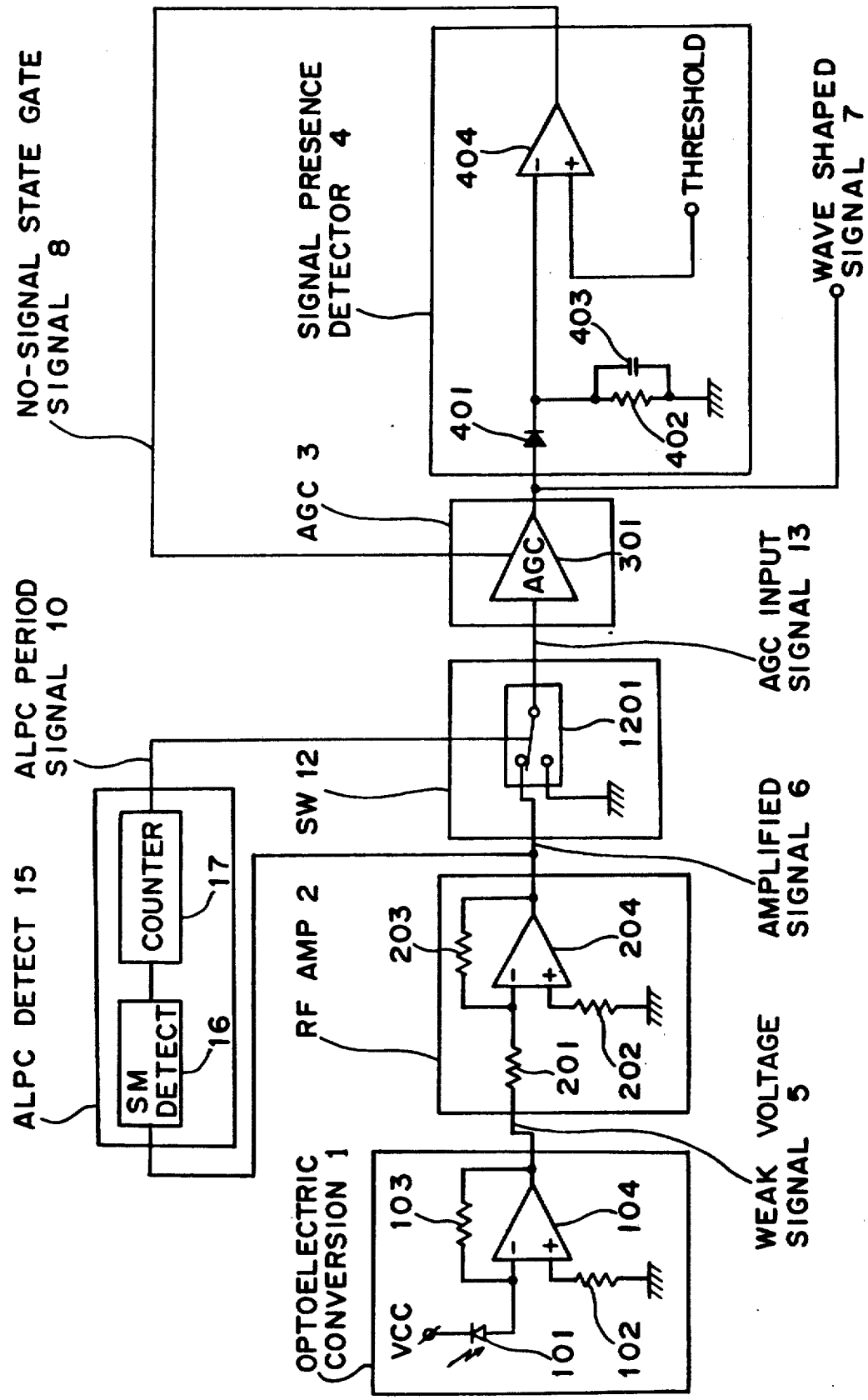
FIG. 5 is a block diagram of a second embodiment of the present invention.

Referring to FIG. 5, a block diagram of an optical disk data reproducing apparatus according to a second embodiment of the present invention is shown. Like parts in FIGS. 1, 3 and 5 are identified with like reference numbers. In FIG. 5, element 1 is an optoelectric conversion circuit; element 2 is an RF amplifier; element 3 is an automatic gain control circuit; element 4 is a signal presence detector; element 5 is a weak current signal; element 6 is an amplified signal; element 7 is a wave shaped signal; element 8 is a no-signal state gate signal; element 10 is an ALPC period signal; element 12 is a switch circuit; element 13 is an AGC input signal; element 15 is an ALPC detector; element 16 is a sector mark detector; element 17 is a counter; element 101 is a PIN diode; element 102 is a resistor; element 103 is a resistor; element 201 is a resistor; element 202 is a resistor; element 203 is a resistor; element 204 is an operational amplifier; element 301 is an automatic gain controller; element 401 is a diode; element 402 is a resistor; element 403 is a capacitor; element 404 is a comparator, and element 1201 is a switch.

The optoelectric conversion circuit 1 receives a read light at the PIN diode 101 and converts the light to a weak current, which is converted to a weak voltage signal 5 by circuit of a current-voltage convertor comprising resistors 102 and 103 and an operational amplifier 104. The weak voltage signal 5 is amplified by an RF amplifier 2 comprising resistors 201, 202 and 203 and operational amplifier 204, and output as amplified signal 6. The switch circuit 12 comprising a switch 1201 outputs the amplified signal directly as the AGC input signal 13 when the ALPC period signal 10 identifying the ALPC period is FALSE, and when the ALPC period signal 10 is TRUE, sets the AGC input signal 13 to 0. The amplitude of the AGC input signal 13 is controlled by the automatic gain control circuit 3 comprising the automatic gain controller 301, and is output as the wave shaped signal 7.

This wave shaped signal 7 is input to a signal presence detector 4. The signal presence detector 4 has an envelope detector, which comprises a diode 401, resistor 402, and capacitor 403, and which generates an envelope detected signal indicating the change in amplitude of the wave shaped signal 7. The envelope detected signal and a threshold value are compared by the comparator 404, and if the envelope detected signal is less than the threshold value, a no-signal state gate signal 8 indicating that the envelope detected signal is a no-signal state is set TRUE. The no-signal state gate signal 8 is input to the automatic gain control circuit 3 as the gain hold control signal, and when the no-signal state gate signal 8 is TRUE, the automatic gain control circuit 3 holds the amplification rate to maintain a constant amplification rate.

Figure 6:
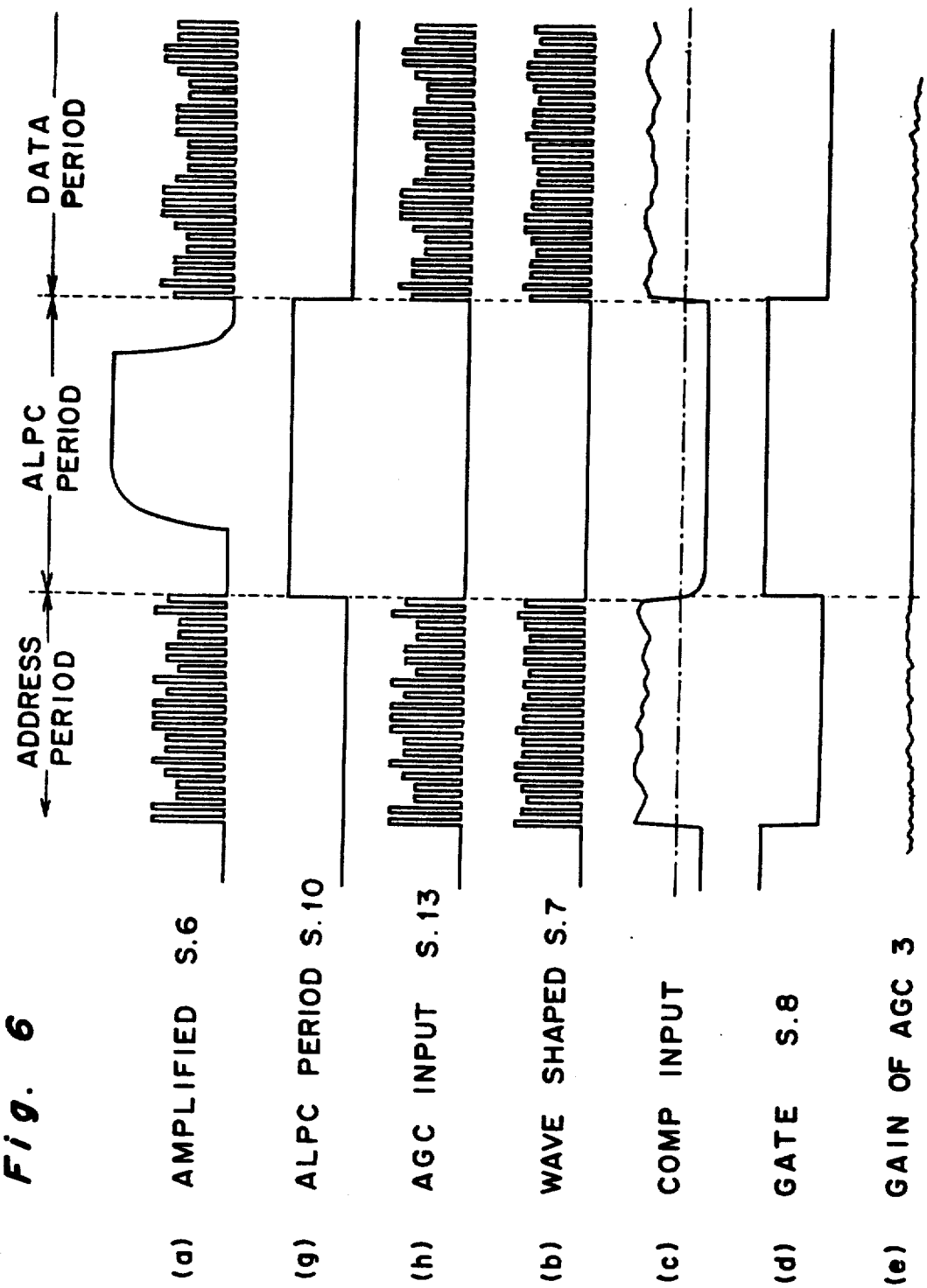
FIGS. 6(a-e) are diagrams of the signal waveform before and after the ALPC period in the second embodiment of the present invention.

FIG. 6 shows the signal waveforms before and after the ALPC period according to a second embodiment of the present invention. Like signals are identified with like reference letters in FIG. 2 for the conventional device, FIG. 4 for the preferred embodiment, and FIG. 6. In FIG. 6, waveform (a) is the waveform of the amplified signal 6 output from the RF amplifier 2; waveform (b) is the waveform of the wave shaped signal 7 output from the automatic gain control circuit 3; waveform (c) is the waveform of the input signal to the comparator 404 in the signal presence detector 4; (d) is the waveform of the no-signal state gate signal 8 output from the signal presence detector 4, and is the control signal which holds the gain level of the automatic gain control circuit 3; (f) is the waveform of the ALPC period signal 10 identifying the ALPC period; and (g) is the waveform of the AGC input signal 13 output from the switch circuit 12. The waveform (a) of the amplified signal 6 has a signal amplitude significantly greater in the ALPC period than in the address period and the data period.

The operation in the ALPC period is described first. The amplitude of waveform (g) of the AGC input signal 13 of becomes 0 because the switch circuit 12 cuts off the amplified signal (a) due to the ALPC period signal 10 (f) identifying the ALPC period. The automatic gain control circuit 3 attempts to reduce the change of the signal amplitude change in the waveform (g) of the AGC input signal 13, but is unable to trace rapid changes due to the response rate of the automatic gain control circuit 3. Therefore, the waveform (b) of the wave shaped signal 7 output from the automatic gain control circuit 3 has zero amplitude. The signal presence detector 4 generates the envelope detected signal of the wave shaped signal 7. This envelope detected signal is the input signal (solid line in (c)) to the comparator 404, which compares the input signal with a threshold value (dot-dash line in (c)), and the no-signal state gate signal 8 (d) is set TRUE. This TRUE no-signal state gate signal 8 (d) is input to the automatic gain control circuit 3, which thus holds the gain level.

The operation in the data period after the ALPC period is described next.

In the data period, the switch circuit 12 directly outputs the waveform (a) of the amplified signal as the waveform (g) of the AGC input signal, because the ALPC period signal (f) identifying the ALPC period is FALSE. At the beginning of the data period, the gain level matches the gain level at the end of the address period because the automatic gain control circuit 3 holds the gain level in the ALPC period. With the gain level set at the end of the address period, the signal presence detector 4 outputs a wave shaped signal (b) with a non-zero amplitude because the waveform (g) of the AGC input signal is input. The signal presence detector 4 generates the envelope detected signal of the wave shaped signal 7. This envelope detected signal is the input signal (solid line in (c)) to the comparator 404, which compares the input signal with a threshold value (dot-dash line in (c)), and the no-signal state gate signal 8 (d) output is set FALSE. This FALSE no-signal state gate signal 8 (d) is input to the automatic gain control circuit 3, which starts gain adjustment again to hold the waveform (b) of the wave shaped signal constant. Therefore, if there is not a great difference in the amplitude of the amplified signal (a) between the address period and the data period, the signal can be stably reproduced in the data period because the difference in the held gain level and the gain level used by the automatic gain control circuit 3 to maintain the target amplitude in the wave shaped signal (b) is small.

It is to be noted that in this second embodiment, the switch circuit 12 is located between the RF amplifier 2 and the automatic gain control circuit 3, but it may also be located between the optoelectric conversion circuit 1 and the RF amplifier 2, or between the automatic gain control circuit 3 and the signal presence detector 4, or at the input stage of the comparator 404 in the signal presence detector 4.

Figure 7:
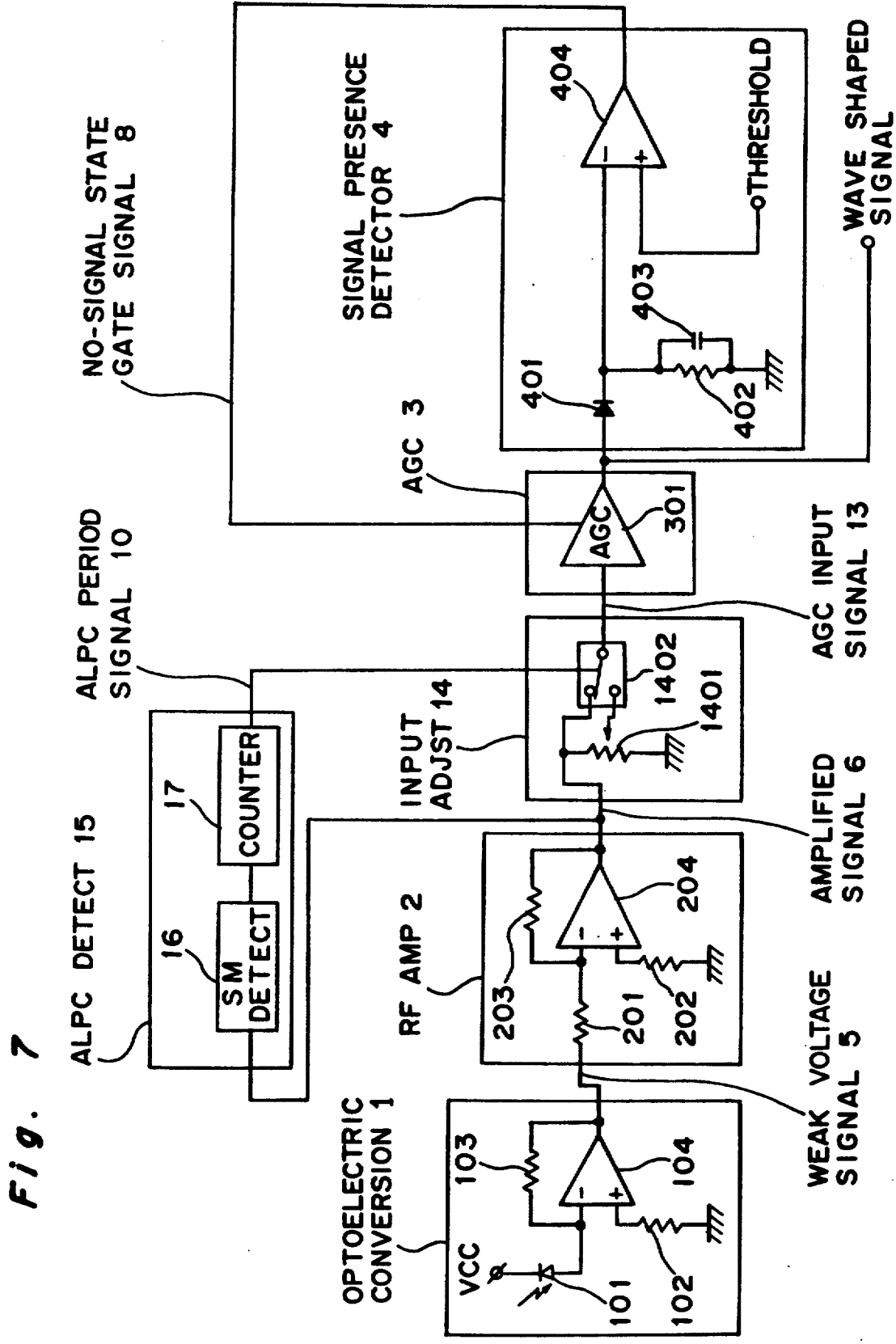
FIG. 7 is a block diagram of a third embodiment of the present invention.

Referring to FIG. 7, a block diagram of an optical disk data reproducing apparatus according to a third embodiment of the present invention is shown. Like parts in FIGS. 1, 3, 5 and 7 are designated with like reference numbers. In FIG. 7, element 1 is an optoelectric conversion circuit; element 2 is an RF amplifier; element 3 is an automatic gain control circuit; element 4 is a signal presence detector; element 5 is a weak current signal; element 6 is an amplified signal; element 7 is a wave shaped signal; element 8 is a no-signal state gate signal; element 10 is an ALPC period signal; element 13 is an AGC input signal; element 14 is an input adjustment circuit; element 15 is an ALPC detector; element 16 is a sector mark detector; element 17 is a counter; element 101 is a PIN diode; element 102 is a resistor; element 103 is a resistor; element 201 is a resistor; element 202 is a resistor; element 203 is a resistor; element 204 is an operational amplifier; element 301 is an automatic gain controller; element 401 is a diode; element 402 is a resistor; element 403 is a capacitor; element 404 is a comparator; element 1401 is a variable resistor, and element 1402 is a switch.

The optoelectric conversion circuit 1 receives a read light at the PIN diode 101 and converts the light to a weak current, which is converted to a weak voltage signal 5 by circuit of a current-voltage convertor comprising resistors 102 and 103 and an operational amplifier 104. The weak voltage signal 5 is amplified by an RF amplifier 2 comprising resistors 201, 202, and 203 and operational amplifier 204, and output as amplified signal 6. The input adjustment circuit 14 comprising the variable resistor 1401 and switch 1402 outputs the amplified signal from RF amplifier 2 to the AGC 3 when the ALPC period signal 10 identifying the ALPC period is FALSE. But, when the ALPC period signal 10 is TRUE, an attenuated signal is supplied to AGC 3. The amplitude of the AGC input signal 13 is changed by the automatic gain control circuit 3 comprising the automatic gain controller 301, and is output as the wave shaped signal 7.

The wave shaped signal 7 is input to a signal presence detector 4. The signal presence detector 4 has an envelope detector comprising a diode 401, resistor 402, and capacitor 403, which generates an envelope detected signal indicating the change in amplitude of the wave shaped signal 7. The envelope detected signal and a threshold value are compared by the comparator 404, and if the envelope detected signal is less than the threshold value, a no-signal state gate signal 8 indicating that the envelope detected signal is a no-signal state is set TRUE. The no-signal state gate signal 8 is input to the automatic gain control circuit 3 as the gain hold control signal, and when the no-signal state gate signal 8 is TRUE, the automatic gain control circuit 3 holds the gain to the predetermined value.

FIG. 8 shows the signal waveforms before and after the ALPC period. Like signals are identified with like reference letters in FIGS. 2, 4, 6 and 8. In FIG. 8, (a) is the waveform of the amplified signal 6 output from the RF amplifier 2; (b) is the waveform of the wave shaped signal 7 output from the automatic gain control 3; (c) is the waveform of the input signal to the comparator 404 in the signal presence detector 4; (d) is the waveform of the no-signal state gate signal 8 output from the signal presence detector 4, and is the control circuit 3; (g) is the waveform of the ALPC period signal 10 identifying the ALPC period; and (h) is the waveform of the AGC input signal 13 output from the input adjustment circuit 14. The waveform (a) of the amplified signal 6 has a signal amplitude significantly greater in the ALPC period than in the address period and the data period.

The operation in the ALPC period is described first. The amplitude (h) of the AGC input signal 13 is reduced because the amplified signal (a) is attenuated by the input adjustment circuit 14 due to the ALPC period signal 10 (g) which identifies the ALPC period. The attenuation of the input adjustments circuit 14 is preadjusted so that the waveform amplitude of the ALPC period is made equivalent to the waveform amplitude of the data period. In the no-signal period of the ALPC period, the automatic gain control circuit 3 attempts to unify the signal amplitude in the waveform (h) of the AGC input signal 13, but is unable to trace rapid changes due to the response rate of the automatic gain control circuit 3. Therefore, the waveform (b) of the wave shaped signal 7 output from the automatic gain control circuit 3 has zero amplitude. The signal presence detector 4 generates the envelope detected signal of the wave shaped signal 7. The envelope detected signal is the input siganl (solid line in (c)) to the comparator 404, which compares the input signal with a threshold value (dot-dash line in (c)), and the no-signal state gate signal 8 (d) is set TRUE. The True no-signal state gate signal 8 (d) is input to the automatic gain control circuit 3, which thus holds the gain level.

In the ALPC period where there is a signal, the automatic gain control circuit 3 adjusts the gain to maintain a constant amplitude in the wave shaped signal 7 waveform (b).

The operation in the data period after the ALPC period is described next.

In the data period, the input adjustment circuit 14 directly outputs the waveform (a) of the amplified signal as the waveform (h) of the AGC input signal because the ALPC period signal (g) identifying the ALPC period is FALSE. At the beginning of the data period, the gain level is that held by the automatic gain control circuit 3 at the end of the ALPC period. The amplitude where there is a signal in the ALPC period is attenusated by the input adjustment circuit 14 so that it is equivalent to the amplitude in the data period, and the held gain level is therefore appropriate to the amplitude of the data period. The automatic gain control circuit 3 outputs a non-zero amplitude wave shaped signal (B) because the AGC input signal of waveform (h) is input therto. The signal presence detector 4 generates the envelope detected signal of the wave shaped signal 7. This envelope detected signal is the input signal (solid line in (c)) to the comparator 404, which compares the input signal with a threshold value (dot-dash line in (c)), and the no-signal state gate signal 8 (d) output is set FALSE. This FALSE no-signal state gate signal 8 (d) is input to the automatic gain control circuit 3, which starts gain adjustment again to hold the waveform (b) of the wave shaped signal constant. Therefore, the signal can be stably reproduced in the data period because the difference in the held gain level and the gain level used by the automatic gain control circuit 3 to maintain the target amplitude in the wave shaped signal waveform (b) is small.

It is to be noted that in this third embodiment the input adjustment circuit 14 is located between the RF amplifier 2 and the automatic gain control circuit 3, but it may also be located between the optoelectric conversion circuit 1 and the RF amplifier 2.

What is claimed is:

1. An optical disk data reproducing apparatus for reading and reproducing, from an optical disk, data having an address period, an ALPC (Automatic Laser Power Control) period and a data period, with said ALPC period containing a no-signal state at opposite ends, said apparatus comprising:
    an optoelectric conversion means for optically reading data on said optical disk and for converting the read data to an electrical signal;
    an automatic gain control means for receiving and changing the amplitude of said electrical signal, said automatic gain control means having an active state and suspended state such that during the active state the gain is automatically controlled relatively to the electrical signal applied thereto, and during the suspended state the gain is held to a gain as set immediately before the suspended state; and
    an ALPC period detection means, operatively connected to said automatic gain control means, for detecting said ALPC period in said data and for producing an ALPC period signal indicative of the ALPC period, said automatic gain control means being set to said suspended state when said ALPC period signal is present and to said active state when said ALPC period signal is not present.

2. An apparatus as claimed in claim 1, further comprising:
    a signal presence detect means for detecting no-signal state in said electrical signal and thereupon producing a no-signal state signal; and
    an OR gate means for logically ORing said no-signal state signal and said ALPC period signal, and for providing an OR-ed signal to said automatic gain control means, wherein said automatic gain control means is set to said suspended state when either one of said ALPC period signal and said no-signal state signal is present and is set to said active state when neither of said ALPC period signal and said no-signal state signal is present.

3. An optical disk data reproducing apparatus for reading and reproducing, from an optical disk data having an address period, an ALPC (Automatic Laser Power Control) period and a data period, with said ALPC period containing a no-signal state at opposite ends, said apparatus comprising:
    an optoelectric conversion means for optically reading data on said optical disk and for converting the read data to an electrical signal;
    a switch means having an output which is switched between a first line carrying said electrical signal and a second line carrying a reduced level signal;
    an ALPC period detecting means, operatively connected to said switch means, for detecting said ALPC period in said data and for producing an ALPC period signal indicative of the ALPC period, said switching means being switched to connect said first line to said output in the absence of said ALPC period signal and to connect said second line to said output when said ALPC period signal is present;
    an automatic gain control means connected to said output for receiving and changing the amplitude of the signal from said switch means, said automatic gain control means having an active state and suspended state such that during the active state the gain is automatically controlled relative to said electrical signal applied thereot, and during the suspended state the gain is held to a predetermined value; and
    a signal presence detect means connected to said automatic gain control means for detecting said no-signal state in said signal produced from automatic gain control means and there upon producing a no-signal state signal, said automatic gain control means being held in said suspended state when said no-signal state signal is present.

4. An apparatus as claimed in claim 3, wherein said reduced level is a ground level, wherein said signal presence detecting means detects said no-signal state during the entire ALPC so as to prevent said automatic gain control means from greatly amplifying signals during said ALPC period.

5. An apparatus as claimed in claim 3, wherein said reduced level is an attenuated level, thereby preventing said automatic gain control means from greatly amplifying signals during ALPC period.

* * * * *